US011637863B2

(12) United States Patent
Yadav et al.

(10) Patent No.: US 11,637,863 B2
(45) Date of Patent: Apr. 25, 2023

(54) DETECTION OF USER INTERFACE IMITATION

(71) Applicant: PayPal, Inc., San Jose, CA (US)

(72) Inventors: Meethil Vijay Yadav, Phoenix, AZ (US); Eric Nunes, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 306 days.

(21) Appl. No.: 16/839,553

(22) Filed: Apr. 3, 2020

(65) Prior Publication Data
US 2021/0314352 A1 Oct. 7, 2021

(51) Int. Cl.
*H04L 9/40* (2022.01)
*G06F 16/955* (2019.01)
*G06N 20/00* (2019.01)

(52) U.S. Cl.
CPC ........ *H04L 63/1483* (2013.01); *G06F 16/955* (2019.01); *G06N 20/00* (2019.01); *H04L 63/1416* (2013.01)

(58) Field of Classification Search
None
See application file for complete search history.

(56) References Cited

U.S. PATENT DOCUMENTS

| | | | |
|---|---|---|---|
| 8,650,614 B2 | 2/2014 | Nahari et al. | |
| 9,386,029 B2 | 7/2016 | Pham et al. | |
| 10,404,723 B1 * | 9/2019 | Mushtaq | H04L 63/1425 |
| 10,679,088 B1 * | 6/2020 | Dalal | G06V 20/635 |
| 10,764,313 B1 * | 9/2020 | Mushtaq | G06N 20/00 |
| 11,146,576 B1 * | 10/2021 | Mushtaq | H04L 63/1425 |
| 11,356,479 B2 * | 6/2022 | Prakash | H04L 63/1483 |
| 2006/0123478 A1 * | 6/2006 | Rehfuss | H04L 63/1408 726/22 |
| 2007/0039038 A1 * | 2/2007 | Goodman | H04L 63/1483 726/2 |
| 2008/0172741 A1 * | 7/2008 | Reumann | H04L 63/1441 707/999.005 |
| 2014/0359760 A1 * | 12/2014 | Gupta | H04L 63/1483 726/22 |
| 2018/0068298 A1 | 3/2018 | Nahari | |
| 2019/0014149 A1 * | 1/2019 | Cleveland | H04L 9/3236 |

(Continued)

*Primary Examiner* — Arezoo Sherkat
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed relating to generating trained machine learning modules to identify whether user interfaces accessed by a computing device match user interfaces associated with a set of Internet domain names. A server computer system receives a set of Internet domain names and generates screenshots for user interfaces associated with the set of Internet domain names. The server computer system then trains machine learning modules that are customized for the set of Internet domain names using the screenshots. The server then transmits the machine learning modules to the computing device, where the machine learning modules are usable by an application executing on the computing device to identify whether a user interface accessed by the device matches a user interface associated with the set of Internet domain names. Such techniques may advantageously allow servers to identify whether user interfaces are suspicious without introducing latency and increased page load times.

20 Claims, 9 Drawing Sheets

(56) References Cited

U.S. PATENT DOCUMENTS

| | | | |
|---|---|---|---|
| 2019/0104154 A1* | 4/2019 | Kumar | G06N 20/00 |
| 2020/0067861 A1* | 2/2020 | Leddy | G06F 21/6245 |
| 2020/0204587 A1* | 6/2020 | Hunt | G06F 21/128 |
| 2020/0287913 A1* | 9/2020 | Buck | H04L 63/168 |
| 2020/0358819 A1* | 11/2020 | Bowditch | G06K 9/6267 |
| 2020/0389486 A1* | 12/2020 | Jeyakumar | H04L 63/20 |
| 2021/0203690 A1* | 7/2021 | Nunes | H04L 63/1416 |
| 2021/0234892 A1* | 7/2021 | Narayanaswamy | H04L 63/1466 |

* cited by examiner

*Authentic Login Page 310*

🔒 Paypal.com/us/signin

PayPal

[Email or mobile number]

[Next]

―or―

[Sign Up]

Contact Us | Privacy | Legal | Worldwide

*Authentic URL 312*

*Fig. 3A*

*Different Login Page 320*

🔒 https://verify-webscrid2367.servirc.com/signin/

PayPal

[Email]
[Password]

[Log In]

*Having trouble logging in?*

―or―

[Sign Up]

Contact Us | Privacy | Legal | Worldwide

*Different URL 322*

DETECTION OF USER INTERFACE IMITATION

BACKGROUND

Technical Field

This disclosure relates generally to computer security, and, more specifically, to techniques for identifying suspicious user interfaces accessed by user computing devices.

Description of the Related Art

In some instances, malicious users or organizations may create imitation webpages and provide these webpages to users in an attempt to obtain private user information. For example, a user may receive a phishing email with a link to a login page for an account of the user. In this example, after clicking the link the user's browser is redirected to a malicious login page. In many cases, this malicious login page is visually similar to an authentic login page, such that a user may not realize they are viewing a malicious webpage. As a result, the user is likely to enter their login information into input fields of the malicious login page.

In order to combat phishing attempts, web browsers often consult third-party blacklists prior to displaying a requested webpage in order to provide safer browsing for users. For example, Google Chrome provides a blacklisting service called Google Safe Browsing for various users. Although consultation of third-party blacklists may improve browser security for various users, such techniques often introduce latency due to a web browser having to make external calls to third-party blacklisting applications. In addition, such browser security techniques may fail to identify newly generated phishing webpages. In addition to creating malicious webpages that appear similar to authentic webpages, malicious users often write program code using code obfuscation techniques to bypass systems that attempt to identify malicious webpages based on their program code.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "server computer system configured to train machine learning modules to identify matching user interfaces" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

DETAILED DESCRIPTION

Techniques are disclosed for identifying user interfaces that match authentic user interfaces but are from different network domains than the authentic interfaces. The identified interfaces may be flagged as suspicious based on a threshold interface matching (e.g., as detected by machine learning modules) and differing domains (e.g., based on URL comparison). For example, a browser plugin module may be configured to download trained machine learning modules for automatically identifying whether a webpage requested for display by a user matches a particular authentic webpage. This may be important, in various situations, because a matching webpage from a different URLs may be a malicious phishing webpage, which in turn may lead to exposure of private user data. For example, a phishing webpage may impersonate an authentic login page. In this example, the phishing webpage may include input fields for gathering private user information, such as a username and password. Further in this example, the user may not recognize that the displayed webpage is malicious due to the similar appearance of the webpage to an authentic login page and, as a result, the user may provide their login credentials to the entity providing the phishing webpage. Accordingly, disclosed techniques relate to identifying and reporting suspicious user interfaces, e.g., for further evaluation or blacklisting.

Traditional techniques for identifying suspicious webpages may delay display of a requested URL by introducing longer load times that impede a user's experience. In some situations, a user device may maintain a cache of blacklisted webpages. This cache, however, may require continuous updating and often uses too much of the user device's memory. In addition, the cached local blacklist often requires a lengthy search time to identify a particular webpage included on the list.

The present disclosure describes techniques for training machine learning modules that are downloadable by a web browser plugin module that is installed on a web browser of a user device (e.g., a desktop computer or mobile device). These trained machine learning modules may be executed by the web browser plugin module to identify whether requested or displayed webpages have similar attributes to an authentic webpage. The browser plugin module may then evaluate whether a requested similar webpage is suspicious based on comparing the URL of the requested webpage with the URL of the authentic webpage.

The web browser plugin module installed on a user device may determine a list of websites that are commonly visited by the user. For example, the plugin module may identify a list of websites where the user of the user device has accounts or has completed transactions (e.g., payment transactions). As one specific example, the plugin module may access an account manager repository (e.g., a keychain or a password manager) of the user device to obtain this list. Based on this information, the browser plugin module provides a list of websites to a server that may be used for training machine learning modules. The server system visits login pages associated with the list of websites and captures screenshots of these login pages. After training one or more machine learning modules to identify login pages that are similar to the login pages associated with the list of websites, the server system provides these modules to the browser plugin on the user device. These machine learning modules are small in size because they are dedicated to a limited set of interfaces relevant to a particular user device, and may be stored by the browser plugin module and used to detect suspicious webpages accessed by the user device. Installing the plugin module on a web browser of a user device allows for suspiciousness interface detection to be local to the user device. This may reduce or avoid a need for the user device to access external data such as a blacklist to determine whether a URL of a displayed webpage is suspicious. Consequently, the disclosed techniques may advantageously reduce latency and page load times while detecting and reporting on suspicious webpages.

Example Match Identification

Figure 1A:
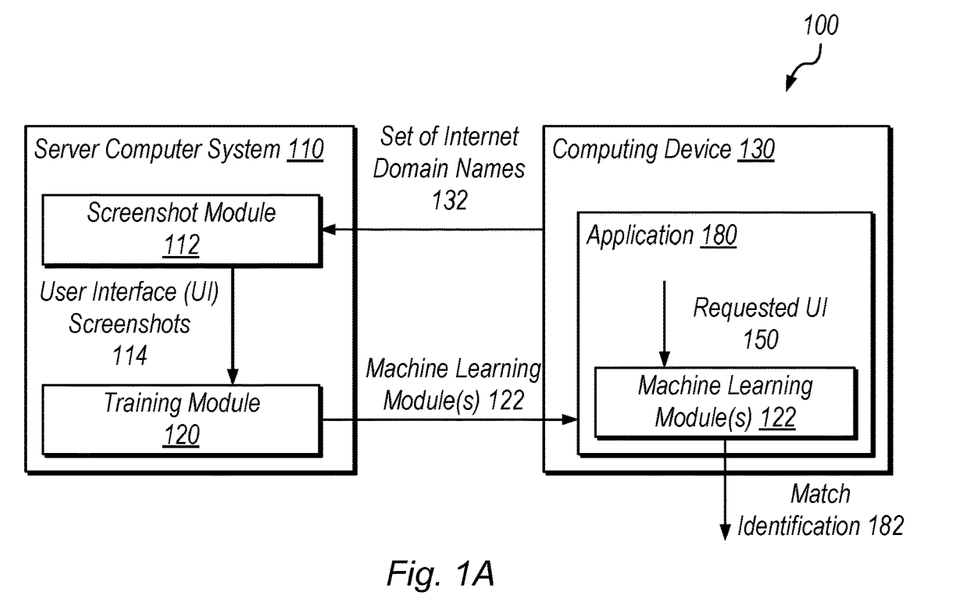
FIG. 1A is a block diagram illustrating a server computer system configured to train machine learning modules to identify whether different user interfaces (UIs) match, according to some embodiments.
Figure 1B:
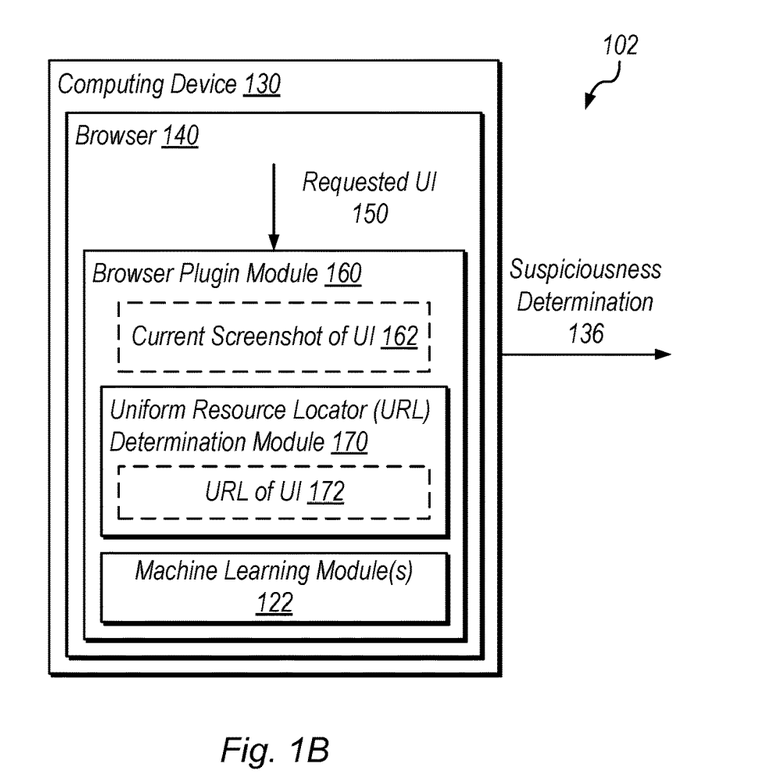
FIG. 1B is a block diagram illustrating a computing device configured to determine whether a UI requested by a user of the computing device for display via a browser is suspicious, according to some embodiments.

FIG. 1A is a block diagram illustrating a server computer system configured to train machine learning modules to identify whether different user interfaces (UIs) match. FIG. 1B is a block diagram illustrating a computing device configured to determine whether a UI requested by a user of the computing device for display via a browser is suspicious. While FIG. 1A illustrates a server computer system 110 configured to provide trained machine learning modules to a computing device 130, FIG. 1B illustrates a suspiciousness determination by computing device 130 using the trained machine learning modules. In the illustrated embodiment, system 100 includes server computer system 110 and computing device 130, while system 102 includes computing device 130.

In FIG. 1A, server computer system 110 receives a set 132 of Internet domain names from computing device 130. Screenshot module 112 of server computer system 110 generates screenshots 114 of UIs associated with domain names included in the set 132. A screenshot may include, for example, a rendering of all or a portion of a user interface based on user interface code. The rendering may have one of the following image file formats: JPEG, PNG, Bitmap, etc.

In the illustrated embodiment, server computer system 110 trains one or more machine learning modules 122 using the screenshots generated by module 112. After training machine learning module(s) 122, server computer system 110 transmits one or more of these modules to computing device 130.

Computing device 130, in FIG. 1A, is configured to execute an application 180, which includes one or more machine learning modules 122 received from training module 120. In the illustrated embodiment, application 180 uses machine learning module(s) 122 to identify whether a requested UI 150 (e.g., requested by a user of computing device 130) matches a UI associated with set 132 of Internet domain names and outputs a result of the match identification signal 182. For example, application 180 may input a screenshot of the requested UI 150 and a screenshot of one or more UIs associated with the set 132 of Internet domain names to a machine learning module 122 to obtain a machine learning output specifying whether the two UIs match. Match identification signal 182 may specify that the two UIs are within a threshold similarity of one another. Application 180 may be a web browser or another type of application downloaded on a mobile device (one example of computing device 130), for example.

In some embodiments, based on identifying that the two UIs match, application 180 verifies an address used by the computing device to access the UI 150. For example, application 180 may compare the address of UI 150 with the address of the matching UI associated with the set 132 of Internet domain names. If the two addresses are not the same, then application 180 may determine that the UI 150 is suspicious. The addresses may be uniform resource identifiers (URIs) or uniform resource locators (URLs), for example.

In FIG. 1B, computing device 130 includes browser 140, which in turn includes requested UI 150 and browser plugin module 160. Browser plugin module 160, in the illustrated embodiment, includes URL determination module 170 and one or more machine learning modules 122. Browser plugin module 160 is one example of application 180 and may be a plugin that is installed by a web browser of a user device. This web browser plugin may then be used to download one or more machine learning modules from server computer system 110. These machine learning modules may be updated periodically or in response to certain events (e.g., a user of device 130 visiting a new website). For example, browser plugin module 160 may periodically download new or updated machine learning modules from server computer system 110.

Browser plugin module 160, in the illustrated embodiment, is configured to capture a current screenshot 162 of the requested UI 150. In addition, browser plugin module 160 uses a machine learning module 122 to identify whether the current screenshot 162 and a screenshot of a UI associated with the set 132 of Internet domain names match. Specifically, in order to identify a match, browser plugin module 160 downloads one or more machine learning modules 122 from server computer system 110. For example, if the user of device 130 accesses webpages A, B, and C, browser plugin module 160 will download machine learning modules 122 that are trained to identify webpages that are similar to each of webpages A, B, and C, respectively. For example, browser plugin module 160 may capture a screenshot of a requested webpage and input this screenshot into one or more of the machine learning modules 122 downloaded from training module 120. Continuing from this example, if the screenshot is input to the machine learning modules for webpages A, B, and C, the machine learning module for webpage B will identify that the webpage associated with the screenshot matches webpage B, while the machine learning modules for webpages A and C will not identify a match.

Browser plugin module 160, via URL determination module 170, also determines URL 172 of the requested UI. After identifying whether the two UIs match, browser plugin module 160 verifies whether URL 172 of the requested UI and the URL of the first UI are the same. Based on verifying URL 172, computing device 130 outputs suspiciousness determination 136. In some embodiments, suspiciousness determination 136 specifies that the requested UI 150 is suspicious if URL 172 is not the same as the URL it matches (the UI associated with the set 132 of Internet domain names). In situations where URL 172 is suspicious, the device 130 may initiate various activities. For example, device 130 may report the URL 172 to computer system 110 for further investigation. As another example, device 130 may prevent display of the UI 150 or present a warning message before allowing the display.

As used herein, the term "domain name" is intended to be construed according to its well-understood meaning, which includes an identification string that is used to access a particular location. For example, a domain name may identify a particular network domain or internet protocol (IP) resources, such as a personal computer or a server computer hosting a website. An Internet domain name may be used to access a particular location of the Internet. As used herein, the term "match" refers to a determination that two entities are similar to one another. For example, a requested user interface may match a known or authentic user interface if the requested user interface meets some similarity threshold. This similarity threshold may not be visible, e.g., when implemented by a machine learning module that is trained to detect matches. In some embodiments, a machine learning module provides a binary output, e.g., indicating a match or no match. In other embodiments, the machine learning module may output a confidence value between 0 and 1. If this confidence value is greater than some similarity threshold, then the user interface may be tagged as a match. For example, if the confidence value for a particular user interface is 0.8 and the similarity threshold is 0.7, then application 180 may determine that the particular user interface is a match.

As used herein, the term "suspicious" is intended to be construed according to its well-understood meaning, which includes an interface, product, or entity that appears questionable in some way. In some embodiments, suspiciousness is a binary value indicating true (a UI is suspicious) or false (a UI is not suspicious). In other embodiments, suspiciousness may be indicated by a confidence value (e.g., from 0 to 1, with 0 being not suspicious and 1 being 100% suspicious). If a user interface is suspicious, it may require further investigation to determine whether it is malicious and should be added to a blacklist. In some embodiments, a user interface is flagged as suspicious based on the user interface satisfying a threshold match with an authentic user interface and having a different URL than the authentic user interface. There may also be other considerations for flagging user interfaces as suspicious, in various embodiments. Suspiciousness determination is discussed in further detail below with reference to FIG. 6.

Although suspiciousness identification techniques are discussed relative to a browser plugin module, the disclosed techniques may be used in combination with any of various modules other than a browser plugin module, on any of various types of networks (e.g., besides the Internet), for any of various types of user interfaces (e.g., other than webpages).

Example Webpage Suspiciousness Determination

Figure 2:
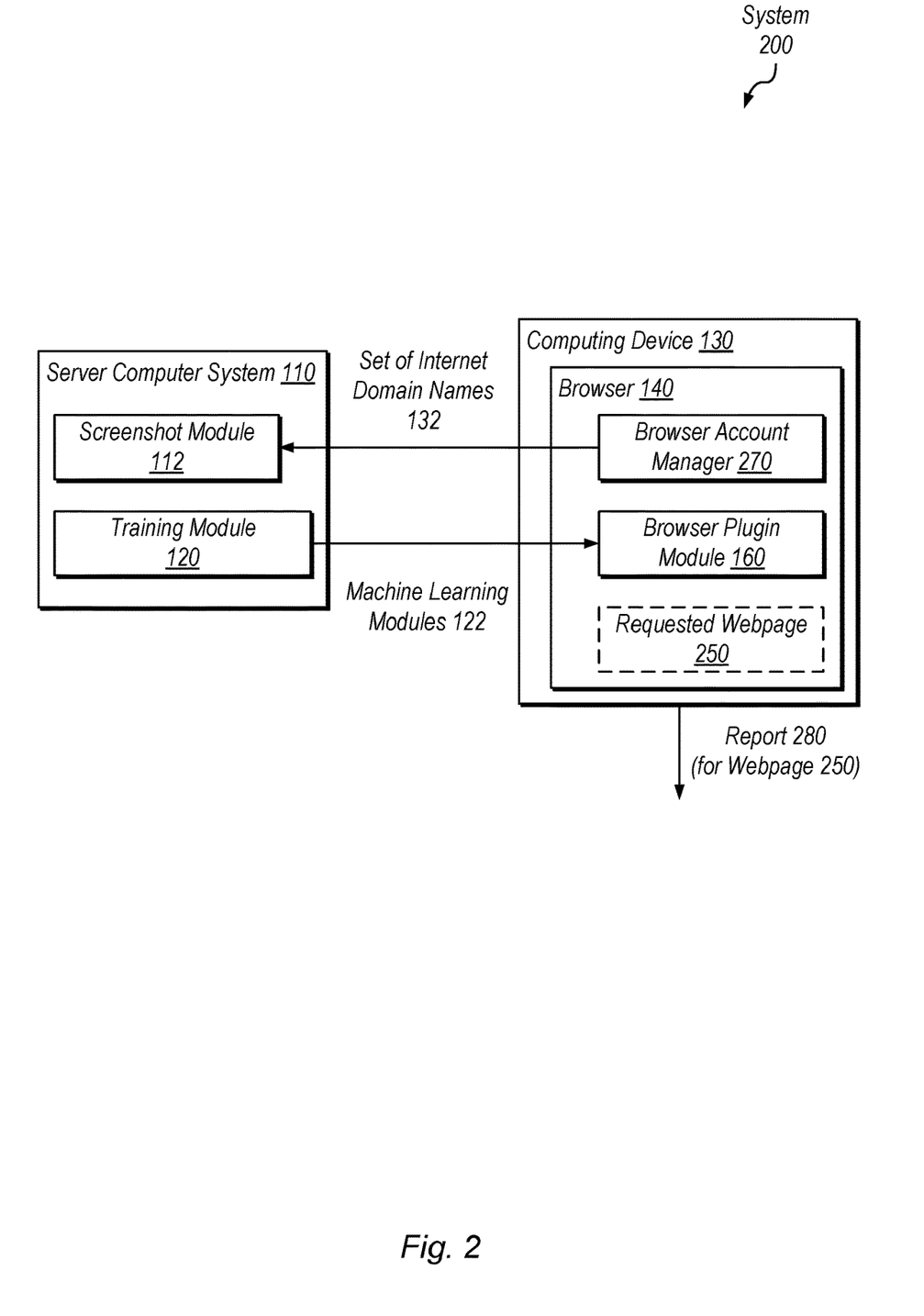
FIG. 2 is a block diagram illustrating an example system that includes a computing device configured to generate a report for a webpage, according to some embodiments.

FIG. 2 is a block diagram illustrating a computing device configured to generate a report for a webpage. In the illustrated embodiment, system 200 includes server computer system 110 and computing device 130. Browser 140 includes browser account manager 270 and data from a requested webpage 250.

In the illustrated embodiment, browser 140 generates the set 132 of Internet domain names based on information stored in browser account manager 270. When browser 140 installs browser plugin module 160, this module may access the account manager of computing device 130. Browser account manager 270 may be, for example, any of various password or account managers. A browser account manager may include an encrypted container that securely stores account names, passwords, identifiers, etc. used by the user device. A keychain is one example of a browser account manager. In other embodiments, the set 132 of Internet domains names is specified by a user of the computing device 130. For example, browser plugin module 160 may provide a user of computing device 130 with a dropdown list of Internet domain names that are accessed by users of browser 140 to choose from. In this example, the user may then select a set 132 of Internet domain names from the dropdown list that the user visits and browser plugin module 160 provides this list to screenshot module 112.

Machine learning modules 122 are trained to identify webpages that match webpages associated with domain names included in the set 132 of Internet domain names. For example, a particular trained machine learning module may identify that the requested webpage 250 is within a threshold similarity to a PayPal login page. Further in this example, based on determining that the two login pages are similar, browser plugin module 160 compares the URL of the requested webpage with the URL of the PayPal login page. If the two URLs are not the same, then the requested webpage 250 is suspicious. Based on evaluating requested webpage 250, computing device 130 generates a report 280.

In some embodiments, report 280 includes information associated with the requested webpage 250. For example, the report may include one or more of the following associated with the display of webpage 250: configuration information (e.g., a list of settings) for browser 140, geolocation information for computing device 130, a screenshot, a URL, source code, etc. In some embodiments, computing device 130 provides report 280 to a third-party blacklisting service for verification and inclusion on a blacklist as discussed below with reference to FIG. 6. In other embodiments, computing device 130 transmits report 280 to server computer system 110. Server computer system 110, in turn, may provide report 280 to a third-party blacklisting server. For example, Google, VirusTotal, Microsoft, etc. may use the information provided in report 280 to verify whether a reported webpage is malicious and should be included on a blacklist. Report 280 may advantageously allow for such verification even in situations where third-party blacklisting systems are not able to directly access the malicious content themselves due to the malicious webpage blocking IP addresses associated with the blacklisting systems. For example, owners of malicious websites may block access to third party blacklisting systems based on their known IP address ranges.

In some embodiments, prior to identifying whether requested webpage 250 matches a webpage associated with a domain name in set 132, browser plugin module 160 accesses a locally stored list of identified malicious URLs. For example, browser plugin module 160 may determine whether the URL of requested webpage 250 is included in the locally stored list of identified malicious URLs. If so, then browser plugin module 160 may report and/or block this webpage.

Example Login Pages

Figure 3A:
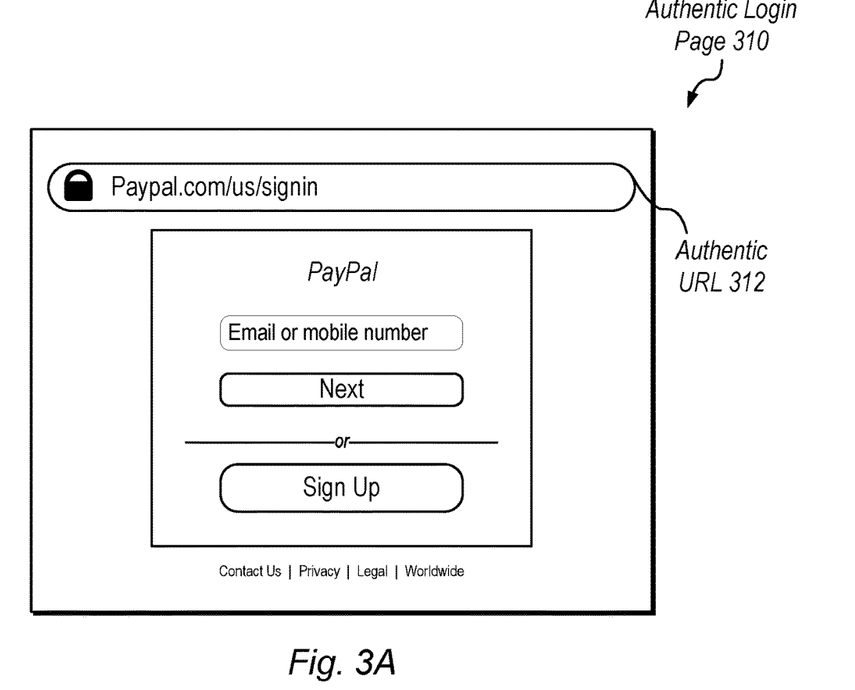
FIGS. 3A and 3B are diagrams illustrating example login pages, according to some embodiments.
Figure 3B:
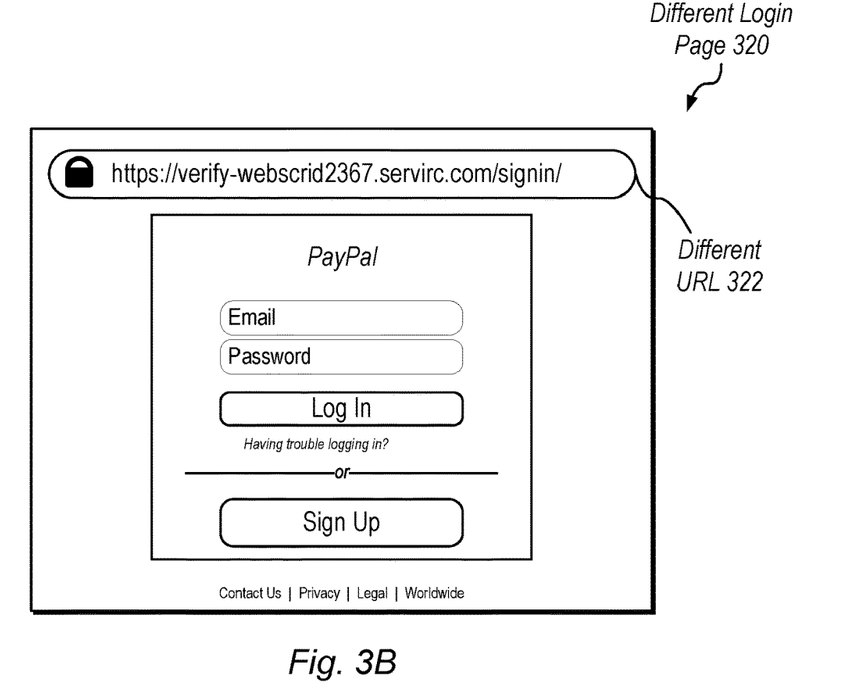

FIGS. 3A and 3B are block diagrams illustrating example login pages. In FIG. 3A, an authentic login page 310 is shown with an authentic URL 312, while in FIG. 3B, a different login page 320 is shown with a different URL 322.

In FIG. 3A, authentic login page 310 is an authentic PayPal login page with an email/mobile number field and the option to either login to an existing account or signup for a new account. This webpage also includes four links at the bottom of the login page that link to other PayPal webpages.

In FIG. 3B, a different login page 320 is not an authentic PayPal login page and is attempting to mimic or appear similar to the PayPal login page. Although login page 320 includes many of the same attributes as authentic login page 310, it also includes additional attributes. For example, login page 320 includes both email and password input fields for logging in to an existing account. In addition, login page 320 includes a password input field, as well as the additional link "Having trouble logging in?" that are not present in the authentic login page 310.

The disclosed webpage evaluation techniques may identify that login page 320 is similar to authentic login page 310 using a machine learning module trained to identify webpages that have similar attributes to the attributes of authentic login page 310. In addition, after identifying that the two login pages are similar, the disclosed techniques may identify that login page 320 is suspicious after comparing URL 322 with the authentic URL 312 and determining that they are not the same. For example, the domains included in URL 322 and URL 312 may be different.

Example User Interface Attribute Extraction

Figure 4:
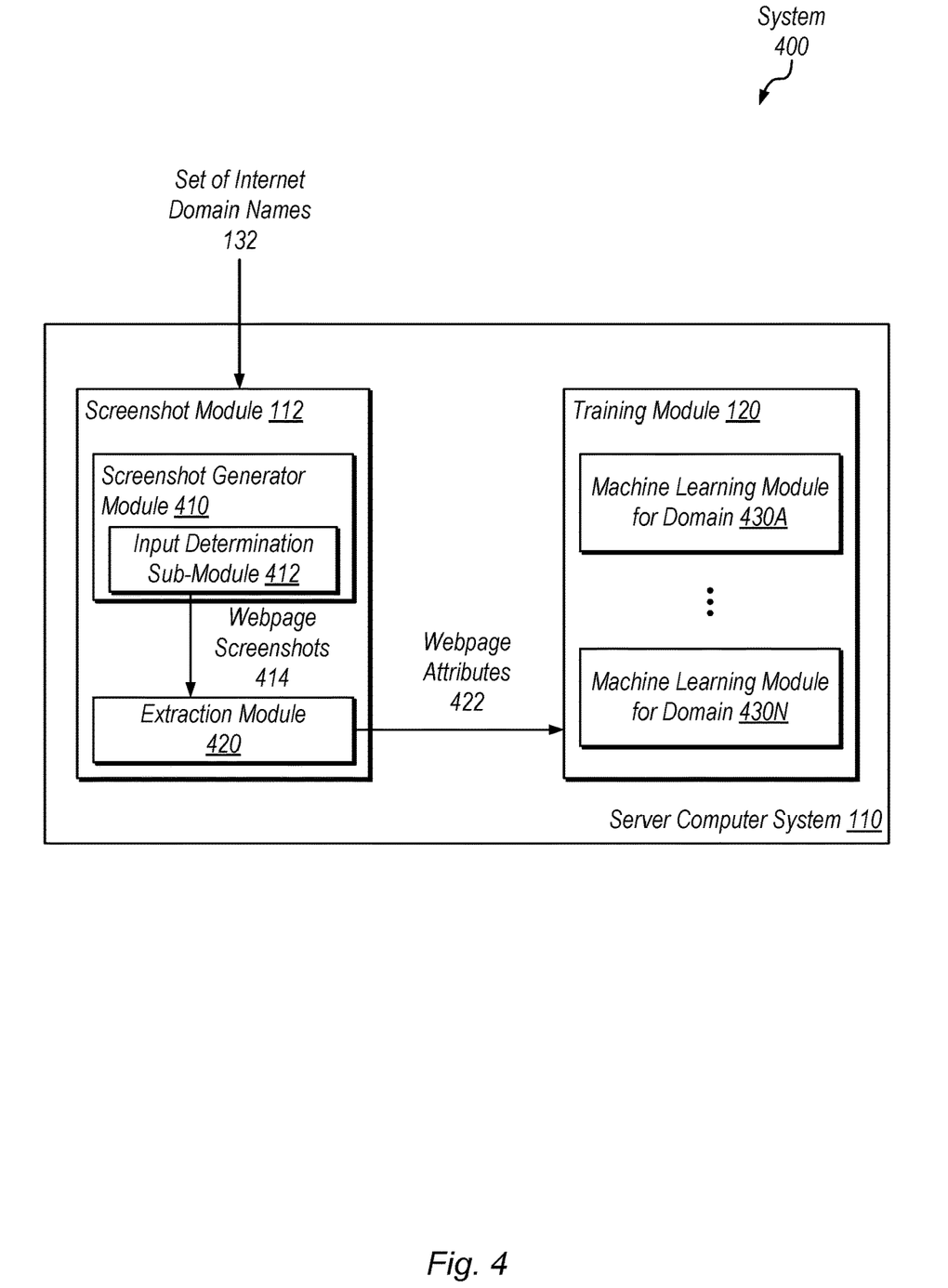
FIG. 4 is a block diagram illustrating example screenshot and training modules of a server computer system, according to some embodiments.

FIG. 4 is a block diagram illustrating example screenshot and training modules of a server computer system. In the illustrated embodiment, screenshot module 112 includes a screenshot generator module 410 and an extraction module 420, while training module 120 includes machine learning modules for different domains 430A-430N.

Screenshot module 112 receives set 132 of Internet domain names. Using the domain names included in set 132, screenshot generator module 410 visits webpages associated with these domain names. Input determination sub-module 412 determines whether the visited webpages include input fields for receiving private user information. In some embodiments, input determination sub-module 412 determines whether a webpage includes input fields based on program code (e.g., JavaScript, hypertext markup language (HTML), cascading style sheets (CSS), etc.) of the webpage. For example, input determination sub-module 412 may determine whether the webpages include input fields for credit card information, a username, a password, an address (e.g., residential or commercial), a social security number, etc. If input determination sub-module 412 determines that a webpage includes input fields, then screenshot generator module 410 captures a screenshot of this webpage and provides the captured screenshots to extraction module 420.

Extraction module 420, in the illustrated embodiment, gathers attributes of webpages from the webpage screenshots 414. Extraction module 420 then sends these webpage attributes 422 to training module 120. Examples of webpage attributes are discussed in detail below with reference to FIG. 5. In some embodiments, extraction module 420 includes a computer vision model that is executable to identify objects within an image.

Training module 120, in the illustrated embodiment, trains multiple machine learning modules for domains 430A-430N to identify webpages that are similar to one or more webpages that receive user input and are associated with a particular domain name. Training module 120 inputs webpage attributes 422 for one or more webpages of domain 430A as input features to a machine learning module for this domain. Training module 120 performs this process of training machine learning modules based on the number of domain names included in the set 132 of Internet domain names. For example, this may be a one-to-one mapping of trained machine learning modules to domain names included in the set. That is, if the set 132 of Internet domain names includes five different domain names, then training module 120 will train five different machine learning modules, one for each domain name.

In some embodiments, training module 120 trains each machine learning module using webpage attributes 422 of a single login page associated with a particular domain name. For example, in the PayPal context, the machine learning module for domain 430A may be trained using webpage attributes gathered from a screenshot of a single PayPal login page. In other embodiments, training module 120 trains a machine learning module using webpage attributes 422 of multiple different webpages associated with a particular domain name (e.g., a business website).

Example Machine Learning

Figure 5:
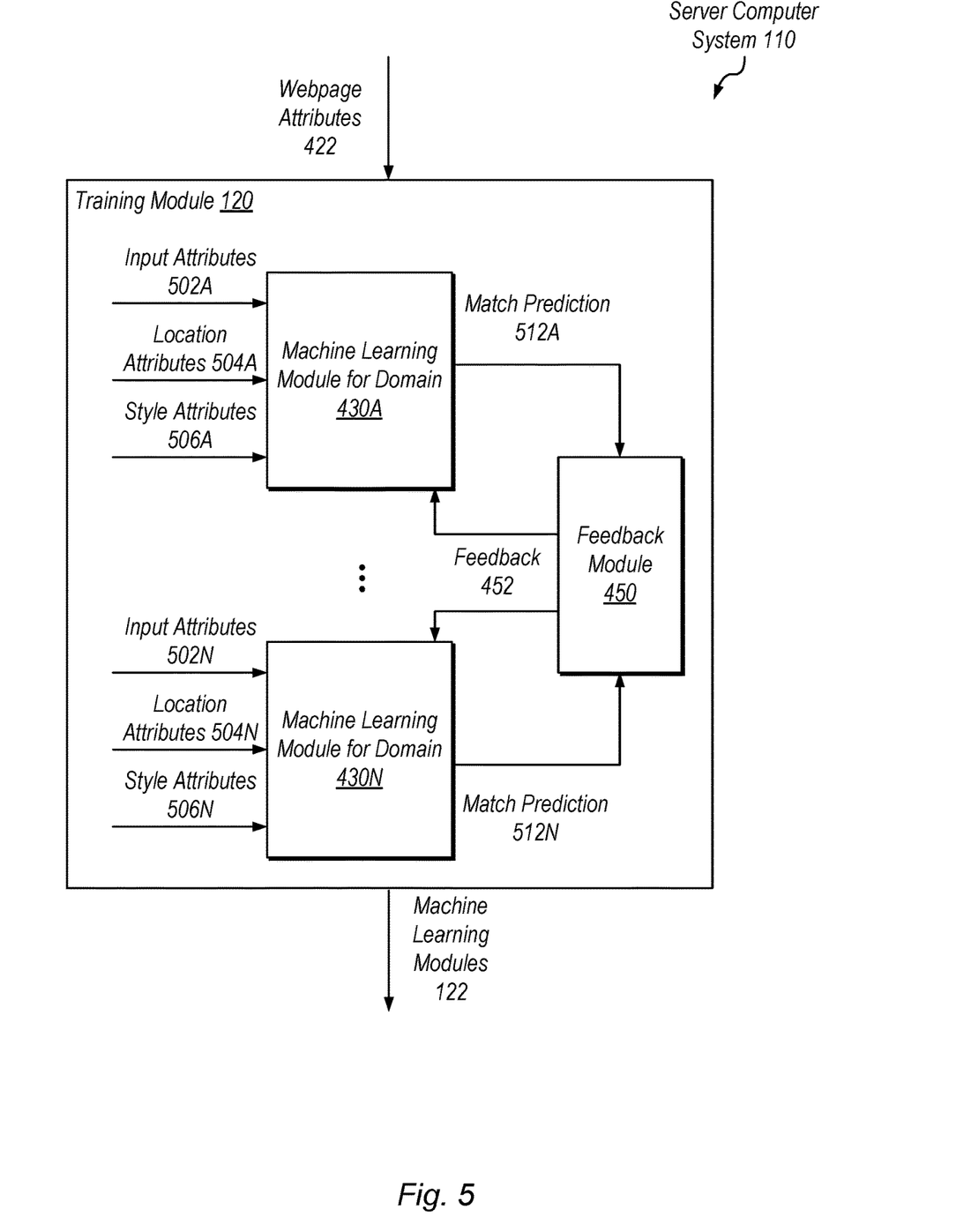
FIG. 5 is a block diagram illustrating example training of machine learning modules, according to some embodiments.

FIG. 5 is a block diagram illustrating example training of machine learning modules. In the illustrated embodiment, training module 120 trains machine learning modules for domains 430 using various webpage attributes 502-506 of authentic webpages.

Training module 120, in the illustrated embodiment, uses webpage attributes as input features for training machine learning modules. For example, during training, the machine learning modules learn what is unique regarding a given webpage in order to be able to identify other webpages that are similar to this webpage. Once the modules are familiar with the attributes of their respective authentic webpages, these modules may be tested during training by inputting attributes of non-authentic webpages that mimic the authentic webpage. Based on these non-authentic webpage attributes, the machine learning modules for domains 430A-430N generate match predictions 512A-512N. Feedback module 450 may compare the output match predictions 512 with known training labels (known classifications for the non-authentic webpages, such as a match or no match) and provides feedback 452 to machine learning modules for domains 430 during training. This feedback may include adjustments for weights (e.g., some webpage attributes (a logo) may be given more weight than others), additional webpage attributes, etc. used during training. Feedback 452 may be specific to each machine learning module based on the domain 430 associated with this module (based on the authentic webpages used to train this module). Training module 120 may use various different machine learning techniques to train machine learning modules for domains 430, including support vector machines and random forest algorithms. These two example machine learning models are executable to determine whether a user interface falls into one of several categories (e.g., does the user interface have similar attributes to a PayPal, Uber, Facebook, etc. webpage?). In addition, these two example machine learning models may advantageously reduce latency during webpage identification relative to other machine learning models.

As one specific example, training module 120 may input a set of webpage attributes 422 for a login page of domain 430A and another set of webpage attributes 422 for a different login page to a machine learning module. In this example, the machine learning module outputs a prediction of whether these two login pages match. In the context of a machine learning classifier, the prediction may be on a scale from 0 to 1, where prediction values close to 1 indicate that two login pages match, while prediction values close to 0 indicate that the two login pages do not match. In some embodiments, the output of machine learning modules for domains 430 indicate a percentage that two webpages match. For example, a prediction value of 0.8 may indicate that two webpages are 80% similar.

Training module 120 may use the following input features during training: input attributes 502, location attributes 504, and style attributes 506. Input attributes 502 may specify, for example, a number of input fields, types of input fields (login information, credit card information, biometrics, etc.), types of login forms (e.g. a payment form), etc. Location attributes 504 may specify, for example, the location of logos, text, images, etc. within a webpage. Additionally, location attributes 504 may specify an ordering for text, logos, images, etc. within the webpage. Style attributes 506 may specify, for example, fonts, colors, sizes, shape, position, etc. of objects within a webpage, the name of an organization or company associated with a webpage, page alignment, etc.

After training machine learning modules for domains 430A-430N, server computer system 110 provides one or more of these trained machine learning modules 122 to a browser plugin module 160 of computing device 130. As discussed below with reference to FIG. 6, browser plugin module 160 may use these machine learning modules 122 to evaluate requested webpages 250.

Example Browser Plugin Module

Figure 6:
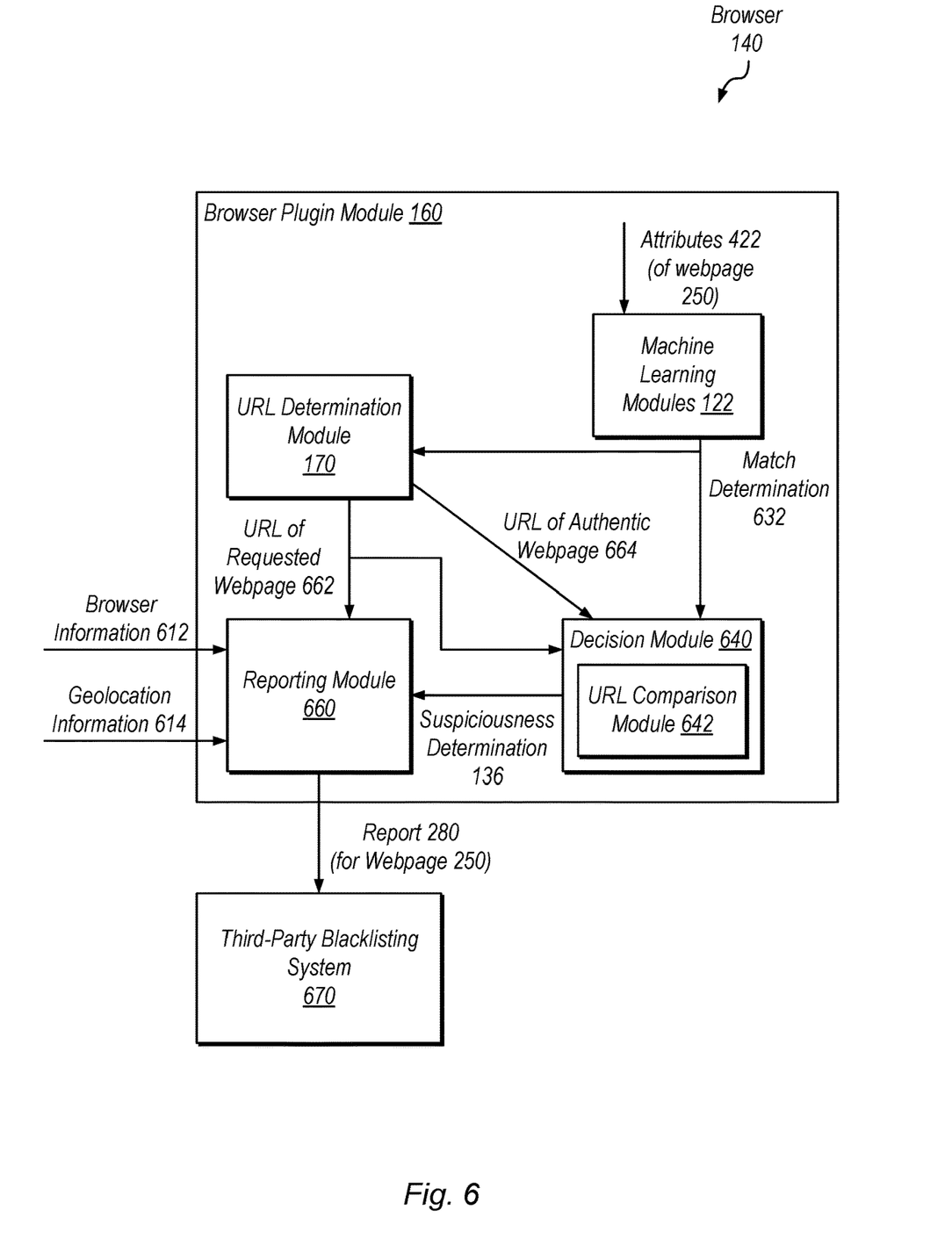
FIG. 6 is a block diagram illustrating an example browser plugin module, according to some embodiments.

Turning now to FIG. 6, a block diagram is shown illustrating an example browser plugin module 160. In the illustrated embodiment, browser 140 provides browser information 612 and geolocation information 614 to reporting module 660 which generates a report 280 for requested webpage 250 (not pictured) to a third-party blacklisting system 670.

Browser plugin module 160, in the illustrated embodiment, provides attributes 422 of requested webpage 250 to one or more trained machine learning modules 122. In some situations, browser plugin module 160 extracts attributes 422 from a screenshot of requested webpage 250. Based on these attributes, the one or more machine learning modules 122 generate a match determination 632 for requested webpage 250 and provide this determination to decision module 640.

Based on receiving match determination 632, URL determination module 170 determines a URL 662 of requested webpage 250 and a URL 664 of an authentic webpage that the requested webpage matches. For example, URL determination module 170 may observe a URL entered by a user of device 130 (when requesting webpage 250) to determine URL 662. URL determination model 170 determines URL 664 of the authentic webpage based on a URL visited by server computer system 110 when training machine learning modules 122. For example, server computer system 110 may provide a mapping between authentic user interfaces used during training and their respective URLs to machine learning modules 122. The machine learning modules 122 then provide these mappings to URL determination module 170. In other embodiments, URL determination module 170 accesses an authentic webpage that the requested webpage 250 matches according to match determination 632 in order to determine URL 664. URL determination module 170 then provides URL 664 to decision module 640 and URL 662 to both reporting module 660 and decision module 640. These two URL determinations performed by module 170 may be performed by observing a URL used to access requested webpage 250 and accessing an authentic webpage that the requested webpage 250 matches according to match determination 632.

Decision module 640, in the illustrated embodiment, includes a URL comparison module 642. URL comparison module 642 compares the URL 664 of the authentic webpage with the URL 662 of the requested webpage 250. Based on the comparison, decision module 640 sends a suspiciousness determination 136 for the requested webpage 250 to reporting module 660. For example, if the two URLs are the same, then the suspiciousness determination 136 specifies that the requested webpage 250 is not suspicious. If, however, the two URLs are not the same, then suspiciousness determination 136 specifies that requested webpage 250 is suspicious. As a result, requested webpage 250 may require further investigation to determine if the webpage is malicious (e.g., a phishing webpage).

Reporting module 660 receives browser information 612 and geolocation information 614 from browser 140. Based on this information, the URL 662 of the requested webpage, and suspiciousness determination 136, reporting module 660 generates report 280 for the requested webpage 250. As discussed above with reference to FIG. 2, report 280 may include the browser information 612 (specifying settings of browser 140 during display of webpage 250), geolocation information 614 (specifying a location of computing device 130 during display of webpage 250), URL 662, and an indication that this is a suspicious webpage. In some embodiments, report 280 is usable to verify whether requested webpage 250 is a malicious webpage. For example, if a third-party blacklisting service such as system 670 can reproduce the requested webpage scenario, including the same browser settings, then this third-party system (such as system 670) may be able to verify that the reported webpage is malicious and may include this webpage on a blacklist.

Example Methods

Figure 7:
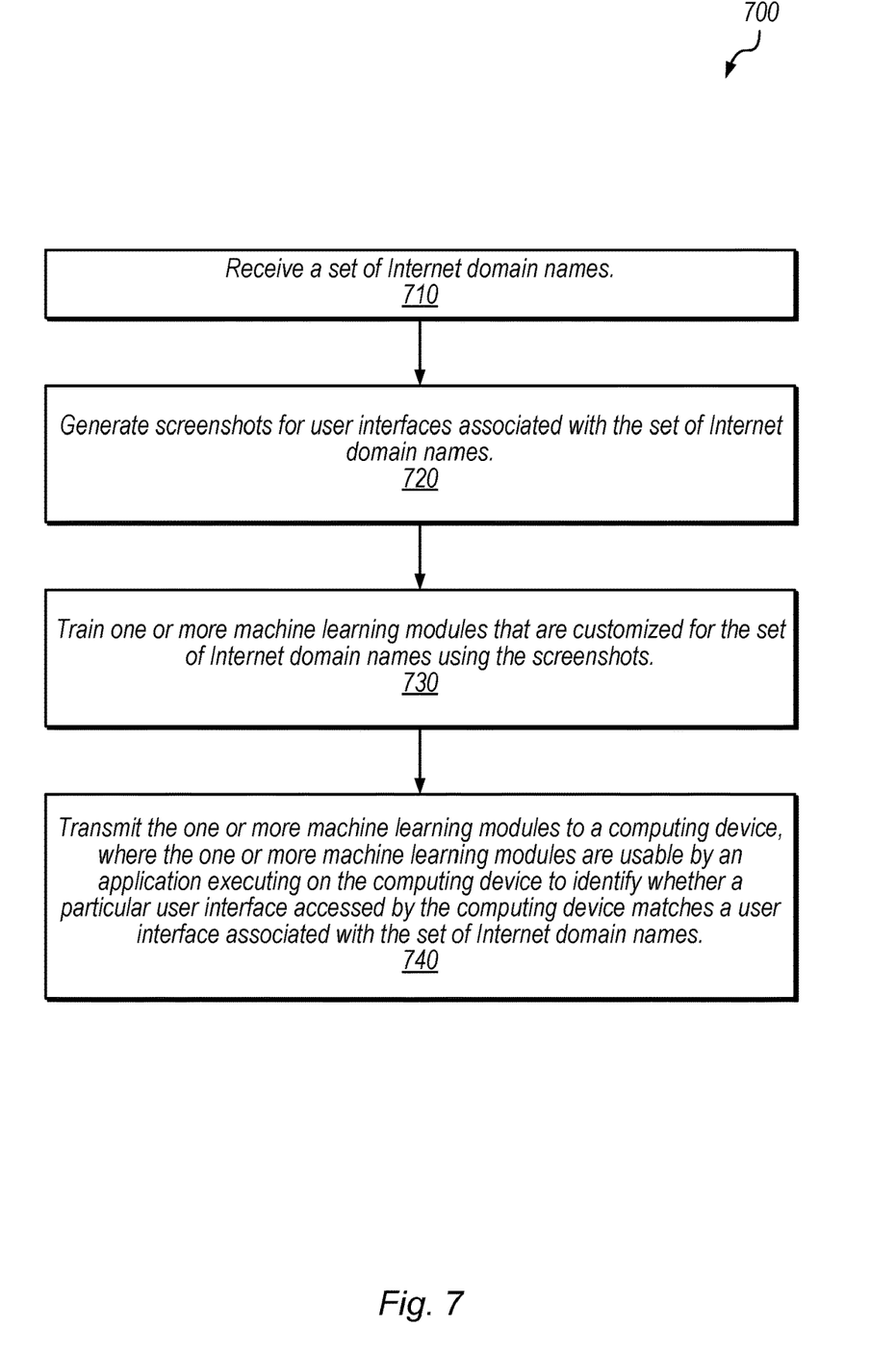
FIG. 7 is a flow diagram illustrating a method for generating trained machine learning modules to identify whether user interfaces accessed by a computing device match user interfaces associated with a set of Internet domain names, according to some embodiments.

FIG. 7 is a flow diagram illustrating a method for predicting a time interval for retrieving a specified number of records beginning at a starting point in time. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a server computer system receives a set of Internet domain names.

At 720, in the illustrated embodiment, the server computer system generates screenshots for user interfaces associated with the set of Internet domain names. In some embodiments, the generating includes identifying, based on program code of user interfaces associated with domain names included in the set, one or more user interfaces that include requests for personal information of a user of the computing device. In some embodiments, the generating further includes capturing screenshots of user interfaces that include requests for personal information.

At 730, in the illustrated embodiment, the server computer system trains one or more machine learning modules that are customized for the set of Internet domain names using the screenshots. In some embodiments, the training includes determining, based on the screenshots, a plurality of attributes of the user interfaces associated with the set of Internet domain names, wherein the plurality of attributes include one or more of: input attributes, location attributes, and style attributes. In some embodiments, the training further includes inputting the determined plurality of attributes to the one or more machine learning modules during training. For example, the plurality of attributes may be machine learning input features. In some embodiments, the server computer system trains a plurality of machine learning modules based on the set of Internet domain names including multiple domain names. For example, the server computer system may train a machine learning module for each domain name included in the set of Internet domain names.

At 740, in the illustrated embodiment, the server computer system transmits the one or more machine learning modules to a computing device, where the one or more machine learning modules are usable by an application executing on the computing device to identify whether a user interface accessed by the computing device matches a user interface associated with the set of Internet domain names. In some embodiments, in response to identifying that the user interface accessed by the computing device matches a user interface associated with the set of Internet domain names, the application is executable to verify an address used by the computing device to access the user interface, where the computing device accesses the user interface via a web browser, and wherein the user interface accessed by the computing device is a webpage.

In some embodiments, the application is a browser plugin module installed on the computing device that is executable to download one or more machine learning modules from the server computer system, where the address is a uniform resource locator (URL) that is usable by the web browser to display the webpage. In some embodiments, the one or more machine learning modules are machine learning classifiers. In some embodiments, the server computer system receives, from the computing device, a report indicating suspiciousness of the user interface accessed by the computing device, where the report includes at least geolocation information of the computing device and a screenshot of the user interface.

Figure 8:
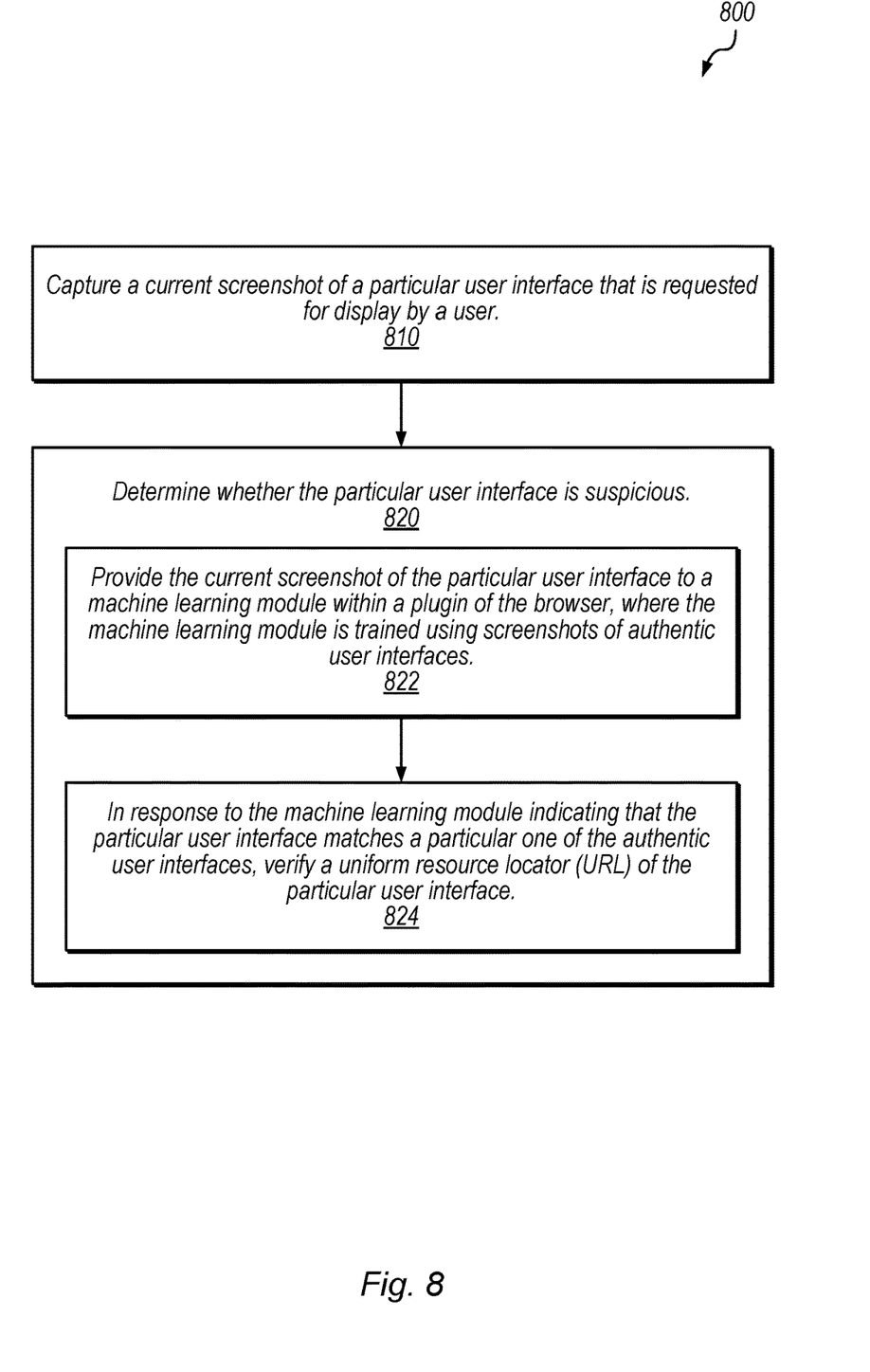
FIG. 8 is a flow diagram illustrating a method for determining whether a user interface accessed by a computing device is suspicious, according to some embodiments.

FIG. 8 is a flow diagram illustrating a method for predicting a time interval for retrieving a specified number of records beginning at a starting point in time. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a computing device captures a current screenshot of a user interface that is requested for display by a user of the computing device. In some embodiments, the capturing of the current screenshot is performed in response to identifying that the user interface requested for display includes a request for personal information of a user of the computing device.

At 820, in the illustrated embodiment, the computing device determines whether the user interface requested for display is suspicious. In some embodiments, the computing device generates, based on the determining, a report for the user interface requested for display, where the report includes at least the current screenshot and the URL of the user interface.

At 822, in the illustrated embodiment, as part of determining whether the user interface is suspicious, the computing device provides the current screenshot of the user interface requested for display to a machine learning module within a plugin of the browser, where the machine learning module is trained using screenshots of authentic user interfaces.

At 824, in the illustrated embodiment, in response to the machine learning module indicating that the user interface requested for display matches a particular one of the authentic user interfaces, verifying, by the computing device, a uniform resource locator (URL) of the user interface requested for display. In some embodiments, the computing device generates a set of Internet domain names based on information stored in a browser account manager of the computing device. In some embodiments, the verifying includes determining whether a uniform resource locator (URL) of the user interface requested for display and a URL of the particular authentic user interface are the same. In some embodiments, the verifying further includes, in response to determining that the URL of the user interface requested for display and the URL of the particular authentic user interface are not the same, determining that the user interface requested for display is suspicious.

In some embodiments, the computing device performs via the plugin of the browser a set of training steps that include transmitting a set of Internet domain names to a training server that is configured to access authentic user interfaces for the set of Internet domain names and use screenshots of the accessed authentic user interfaces to train the machine learning module. In some embodiments, the set of training steps includes receiving the trained machine learning module from the training server. The disclosed browser plugin module provides for local suspiciousness determination for webpages which may advantageously reduce latency and page load times for a browser of a given user device.

Example Computing Device

Figure 9:
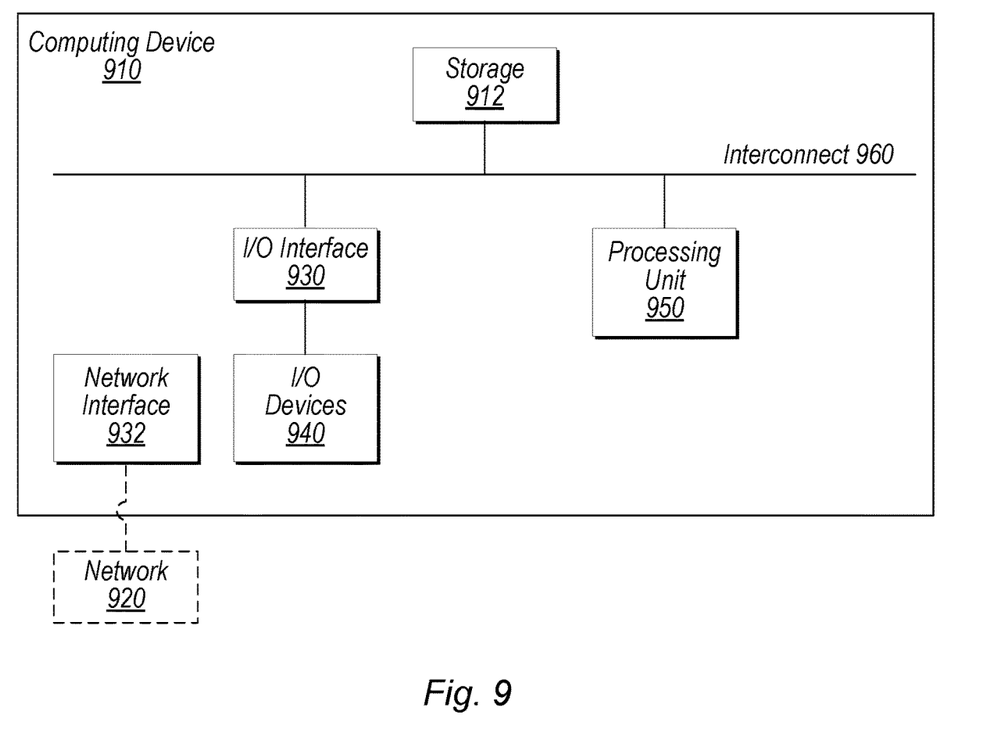
FIG. 9 is a block diagram illustrating an example computing device, according to some embodiments.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 912 may consist solely of volatile memory, in one embodiment. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for reducing latency of user interface suspiciousness determination operations relative to suspiciousness determination operations performed externally to computing devices, comprising:

capturing, by a plugin executing on a computing device of the computing devices, a current screenshot of a user interface that is requested for display by a user of the computing device of the computing devices; and     providing the current screenshot of the user interface to at least one of a plurality of machine learning modules within the plugin, wherein the plurality of machine learning modules are trained at a server computer system using customized sets of screenshots of different authentic user interfaces generated based on a set of Internet domain names that are generated based on information stored in a browser account manager of the computing device of the requesting user;

in response to the at least one machine learning module indicating that the user interface matches a particular one of the authentic user interfaces:
  verifying a uniform resource locator (URL) of the user interface; and
  determining, by the plugin locally to the computing device, whether the user interface is suspicious.

2. The method of claim 1, wherein the plurality of machine learning modules are trained at the server computer system using the customized sets of screenshots of different authentic user interfaces by:
  determining, based on screenshots in one of the customized sets of screenshots of authentic user interfaces, a plurality of attributes of the authentic user interfaces associated with a first Internet domain name, wherein the plurality of attributes include one or more of: input attributes, location attributes, and style attributes; and
  inputting the determined plurality of attributes to a first machine learning module during training.

3. The method of claim 1, wherein the capturing of the current screenshot is performed in response to identifying that the user interface requested for display includes a request for personal information of the user of the computing device.

4. The method of claim 1, further comprising:
performing a set of training operations that comprise:
  transmitting a set of Internet domain names to a training server that is configured to:
    access authentic user interfaces for the set of Internet domain names; and
    use screenshots of the accessed authentic user interfaces to train a machine learning module.

5. The method of claim 4, wherein performing the set of training operations further comprises:
  receiving the trained machine learning module from the training server.

6. The method of claim 1, wherein the verifying includes:
  determining whether a uniform resource locator (URL) of the user interface requested for display and a URL of the particular authentic user interface are the same.

7. The method of claim 6, wherein the verifying further includes:
  in response to determining that the URL of the user interface requested for display and the URL of the particular authentic user interface are not the same, determining that the user interface requested for display is suspicious.

8. The method of claim 1, wherein the set of training operations further comprises:
  generating, based on the determining, a report for the user interface requested for display, wherein the report includes at least the current screenshot and the URL of the user interface.

9. An apparatus, comprising:
one or more processors; and
one or more memory comprising storage elements having program instructions stored thereon that are executable by the one or more processors to:
  capture a current screenshot of a user interface that is requested for display by a user of the apparatus; and
  provide the current screenshot of the user interface to at least one of a plurality of machine learning modules within an application executed locally by the apparatus, wherein the plurality of machine learning modules are trained at a server computer system using customized sets of screenshots of different authentic user interfaces generated based on Internet domain names that are determined based on information stored in a browser account manager of the apparatus;
  in response to the at least one machine learning module indicating that the user interface matches a particular one of the authentic user interfaces:
    verify a uniform resource locator (URL) of the user interface; and
    determine whether the user interface is suspicious, wherein the determining reduces latency relative to suspiciousness determinations performed by another device and accessible to the apparatus.

10. The apparatus of claim 9, wherein the capturing of the current screenshot is performed in response to identifying that the user interface requested for display includes a request for personal information of a user of the apparatus.

11. The apparatus of claim 10, wherein the instructions are further executable by the one or more processors to perform a set of training operations that comprise:
  transmitting a set of Internet domain names to a training server that is configured to:
    access authentic user interfaces for the set of Internet domain names; and
    use screenshots of the accessed authentic user interfaces to train a machine learning module.

12. The apparatus of claim 11, wherein performing the set of training operations further comprises:
  receiving the trained machine learning module from the training server.

13. The apparatus of claim 9, wherein the verifying includes: determining whether a uniform resource locator (URL) of the user interface requested for display and a URL of the particular authentic user interface are the same.

14. A non-transitory computer-readable medium having instructions stored thereon that are executable by a plugin of a browser of a computing device to reduce latency relative to suspiciousness determinations performed externally to the computing device by performing a set of security operations comprising:
  capturing a current screenshot of a user interface that is requested for display by a user of the computing device; and
  providing the current screenshot of the user interface to at least one of a plurality of machine learning modules within the plugin, wherein the plurality of machine learning modules are trained at a server computer system using customized sets of screenshots of different authentic user interfaces generated based on Internet domain names stored in a browser account manager of the computing device;
  in response to the at least one machine learning module indicating that the user interface matches a particular one of the authentic user interfaces:
    verifying a uniform resource locator (URL) of the user interface; and
    determining at the computing device whether the user interface is suspicious.

15. The non-transitory computer-readable medium of claim 14, wherein the capturing of the current screenshot is performed in response to identifying that the user interface requested for display includes a request for personal information of the user of the computing device.

16. The non-transitory computer-readable medium of claim 15, wherein the instructions are further executable by the plugin to perform a set of training operations that comprise:

transmitting a set of Internet domain names to a training server that is configured to:
  access authentic user interfaces for the set of Internet domain names; and
  use screenshots of the accessed authentic user interfaces to train a machine learning module.

17. The non-transitory computer-readable medium of claim 16, performing the set of training operations further comprises:
  receiving the trained machine learning module from the training server.

18. The non-transitory computer-readable medium of claim 14, wherein the verifying includes:
  determining whether a uniform resource locator (URL) of the user interface requested for display and a URL of the particular authentic user interface are the same.

19. The non-transitory computer-readable medium of claim 18, wherein the verifying further includes:
  in response to determining that the URL of the user interface requested for display and the URL of the particular authentic user interface are not the same, determining that the user interface requested for display is suspicious.

20. The non-transitory computer-readable medium of claim 14, wherein the set of security operations further comprise:
  generating, based on the determining, a report for the user interface requested for display, wherein the report includes at least the current screenshot and the URL of the user interface.

* * * * *

UNITED STATES PATENT AND TRADEMARK OFFICE
CERTIFICATE OF CORRECTION

PATENT NO. : 11,637,863 B2
APPLICATION NO. : 16/839553
DATED : April 25, 2023
INVENTOR(S) : Meethil Vijay Yadav et al.

It is certified that error appears in the above-identified patent and that said Letters Patent is hereby corrected as shown below:

In the Claims

In Column 14 (Claim 1), Lines 57-58, please delete "of the computing device of the computing devices; and" and insert -- of the computing device; and --.

Signed and Sealed this
Twenty-third Day of May, 2023

Katherine Kelly Vidal
Director of the United States Patent and Trademark Office